(12) United States Patent
Gummadi et al.

(10) Patent No.: US 10,291,320 B2
(45) Date of Patent: May 14, 2019

(54) POSITIONING USING LIGHT CAPTURING SENSORS

(71) Applicant: QUALCOMM Incorporated, San Diego, CA (US)

(72) Inventors: Bapineedu Chowdary Gummadi, Hyderabad (IN); Hem Agnihotri, Varanasi (IN); Venkata A Naidu Babbadi, Hyderabad (IN)

(73) Assignee: QUALCOMM Incorporated

( * ) Notice: Subject to any disclaimer, the term of this patent is extended or adjusted under 35 U.S.C. 154(b) by 0 days.

(21) Appl. No.: 15/476,177

(22) Filed: Mar. 31, 2017

(65) Prior Publication Data

US 2018/0287700 A1    Oct. 4, 2018

(51) Int. Cl.
| | |
|---|---|
| *H04B 10/116* | (2013.01) |
| *H04W 4/02* | (2018.01) |
| *G06F 1/16* | (2006.01) |
| *G01S 5/16* | (2006.01) |

(52) U.S. Cl.
CPC ............ *H04B 10/116* (2013.01); *G01S 5/163* (2013.01); *G06F 1/163* (2013.01); *G06F 1/1698* (2013.01); *H04W 4/026* (2013.01)

(58) Field of Classification Search
CPC combination set(s) only.
See application file for complete search history.

(56) References Cited

U.S. PATENT DOCUMENTS

| | | | |
|---|---|---|---|
| 3,678,283 A | | 7/1972 | Kenneth |
| 9,134,534 B2 * | | 9/2015 | Border ............... G02B 27/0093 |
| 2007/0135150 A1 | | 6/2007 | Ushiki et al. |
| 2009/0284366 A1 * | | 11/2009 | Haartsen ................... G01S 1/70 340/531 |
| 2010/0109976 A1 * | | 5/2010 | Gilbert .................... F41G 3/225 345/8 |
| 2011/0177805 A1 | | 7/2011 | Maki et al. |
| 2013/0016978 A1 * | | 1/2013 | Son ...................... H04B 10/116 398/118 |
| 2014/0160248 A1 * | | 6/2014 | Pomerantz .............. G06F 1/163 348/47 |

(Continued)

FOREIGN PATENT DOCUMENTS

| | | |
|---|---|---|
| CN | 103297888 A | 9/2013 |
| WO | 2016090413 A1 | 6/2016 |

OTHER PUBLICATIONS

Li L., et al., "Epsilon: A Visible Light Based Positioning System", 11th USENIX Conference on Networked Systems Design and Implementation, NSDI'14 Proceedings, Apr. 2014, pp. 331-343.

(Continued)

*Primary Examiner* — David C Payne
*Assistant Examiner* — Omar S Ismail
(74) *Attorney, Agent, or Firm* — Thien T. Nguyen

(57) ABSTRACT

Techniques described herein, which may provide for a location determination of a mobile device, can also provide for the determination of a viewing direction of a user of the mobile device. In particular, a user can wear a head-mountable apparatus with one or more light sensors configured to detect light from one or more modulated light sources. Using this information, not only may a location of the head-mountable apparatus be determined, but also an orientation, which can enable a determination of an approximate direction the user is looking.

23 Claims, 9 Drawing Sheets

(56) References Cited

U.S. PATENT DOCUMENTS

| | | |
|---|---|---|
| 2014/0375982 A1 | 12/2014 | Jovicic et al. |
| 2015/0373503 A1 | 12/2015 | Jovicic |
| 2016/0027220 A1 | 1/2016 | Jimenez |
| 2016/0191159 A1* | 6/2016 | Aoyama .............. H04N 21/436 398/172 |
| 2017/0104532 A1* | 4/2017 | Stout ................. H04B 10/1149 |

OTHER PUBLICATIONS

Ashwin A., et al., "What Am I Looking at? Low-Power Radio-Optical Beacons for In-View Recognition on Smart-Glass", IEEE Transactions on Mobile Computing, IEEE Service Center, Los Alamitos, CA, US, vol. 15, No. 12, Dec. 1, 2016 (Dec. 1, 2016), XP011633161, ISSN: 1536-1233, DOI:10.1109/TMC.2016.2522967, pp. 3185-3199.

International Search Report and Written Opinion—PCT/US2018/015566—ISA/EPO—dated Jun. 26, 2018.

\* cited by examiner

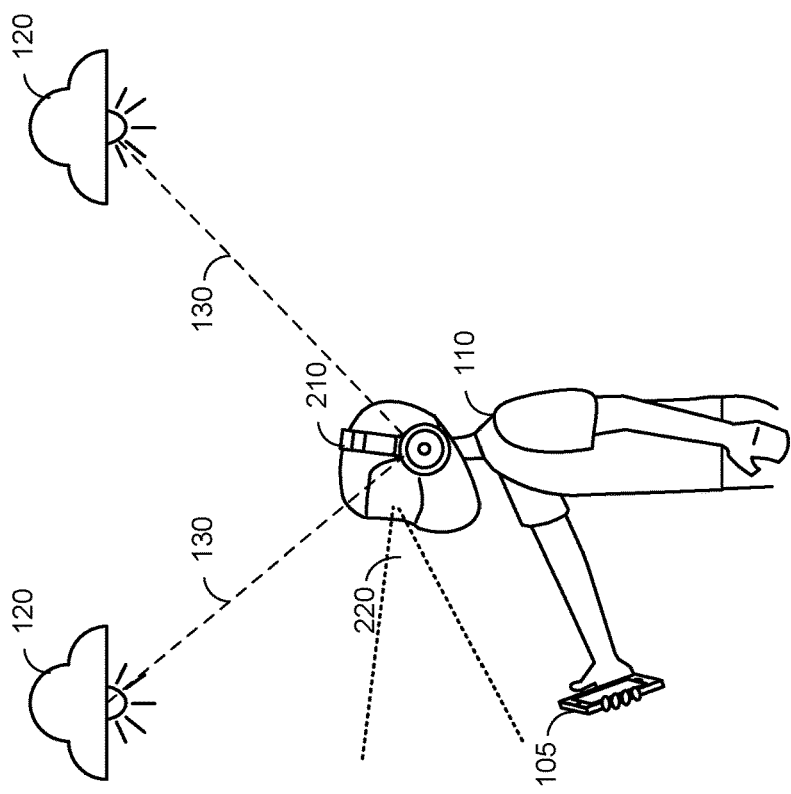
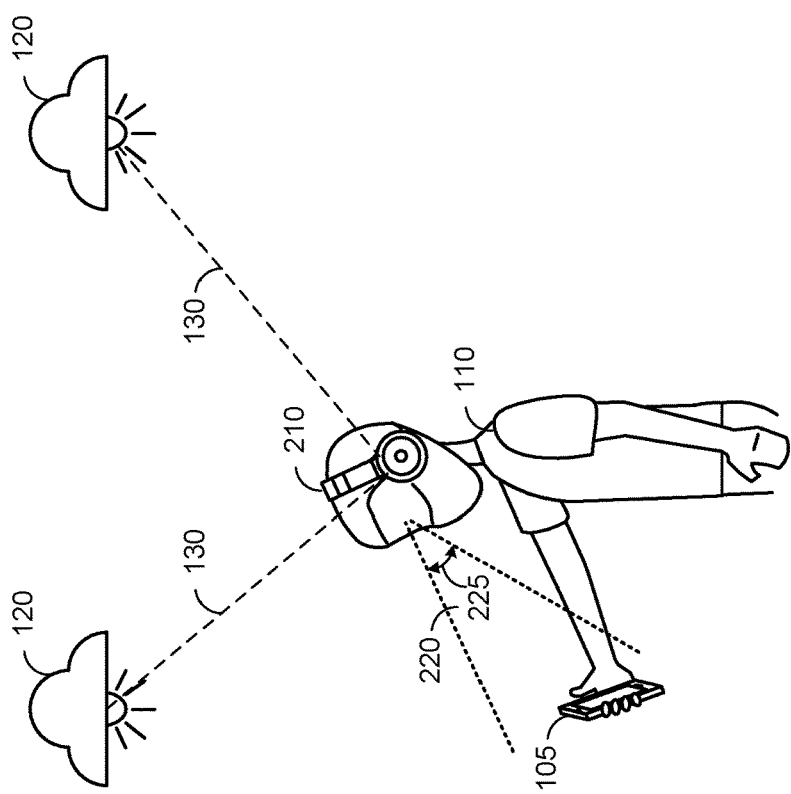

POSITIONING USING LIGHT CAPTURING SENSORS

BACKGROUND

Determining the position of a mobile device (e.g., a mobile phone, tablet, personal media player, wearable device, etc.) can involve any of a variety of techniques, including the use of global positioning system (GPS) (or other satellite-based systems), access points (APs) and/or base stations for radiofrequency (RF)-based location determination, and more. One emerging technology that has been able to provide highly accurate location determination is visible light communication (VLC)-based positioning, which uses light sources with known locations that transmit information by modulating their light, typically at a frequency unnoticeable by human eyes. A mobile device can decode this information to determine its location. (As used herein, a location determination may also be called a "position fix" or "location fix" of the mobile device.) VLC-based positioning can be a particularly useful positioning system indoors.

VLC-based positioning, however, has its limitations. For one, a mobile device needs an unobstructed view of a modulated light source. This means a location fix using VLC cannot be made while the mobile device is in a user's pocket, purse, bag, etc. Additionally, given the information transmitted by the modulated light sources, it is possible to determine more than just a location fix of a mobile device.

SUMMARY

Techniques described herein, which may provide for a location determination of a mobile device, can also provide for the determination of a viewing direction of a user of the mobile device. In particular, a user can wear a head-mountable apparatus with one or more light sensors configured to detect light from one or more modulated light sources. Using this information, not only may a location of the head-mountable apparatus be determined, but also an orientation, which can enable a determination of an approximate direction the user is looking.

An example method of view direction determination, according to the description, comprises receiving sensor data generated by one or more light sensors of a head-mountable apparatus in response to detecting light from one or more modulated light sources, obtaining, for each of the one or more modulated light sources, location information of the respective modulated light source, determining an approximate user view direction based, at least in part, on the sensor data and the location information, and generating, with a processing unit, information indicative of the approximate user view direction.

The example method of view direction determination can additionally include one or more of the following features. The head-mountable apparatus can comprise a processor configured to perform the determining the approximate user view direction and the generating the information indicative of the approximate user view direction. The receiving the sensor data includes receiving the sensor data at a device separate from the head-mountable apparatus, and wherein the determining the approximate user view direction is performed using a processor included in the device. The device can be configured to receive the sensor data from the head-mountable apparatus via wireless communication, the method further comprising obtaining a request to determine the approximate user view direction, and, based on the request, sending an instruction for the sensor data via wireless communication from the device to the head-mountable apparatus, where receiving the sensor data is in response to sending the instruction. The one or more light sensors can comprise a camera, and determining the approximate user view direction can comprise determining, from the sensor data, an angle of arrival of light received from the one or more modulated light sources. Determining the approximate direction can be based on a known direction the one or more light sensors are facing with respect to the head-mountable apparatus, and an approximate location of the head-mountable apparatus on the user's head. The method may further comprise performing a calibration function to determine an approximate location of the head-mountable apparatus on the user's head. The method may further comprise providing the generated information indicative of the determination of the approximate user view direction to an application executed by a computing device. The method may further comprise obtaining information indicating a location of an object, and determining the user is looking at the object based, at least in part, on the determination of the approximate user view direction and the indicated location of the object. Receiving the sensor data can comprise receiving, at a mobile device, sensor data for at least two photodiode measurements of received modulated light, where obtaining the location information comprises obtaining information indicative of an identity of each of the one or more modulated light sources associated with the at least two photodiode measurements based on decoding the received modulated light. The least two photodiode measurements can comprise at least a first measurement from a first photodiode and a second measurement from a second different photodiode, the at least two photodiode measurements taken during a measurement time, where the received modulated light includes received modulated light emitting diode (LED) light and wherein the first photodiode and the second photodiode are configured to detect the LED light. The sensor data received at the mobile device can comprise at least one data type selected from the group consisting of decoded sensor data and modulated sensor data.

An example mobile device enabling view direction determination, according to the description, comprises a wireless communication interface, a memory, and a processing unit communicatively coupled with the wireless communication interface and the memory and configured to receive, via the wireless communication interface, sensor data generated by one or more light sensors of a head-mountable apparatus in response to detecting light from one or more modulated light sources, obtain, for each of the one or more modulated light sources, location information of the respective modulated light source, determine an approximate user view direction based, at least in part, on the sensor data and the location information, and generate information indicative of the approximate user view direction.

The example mobile device can additionally comprise one or more of the following features. The wireless communication interface can be configured to receive the sensor data from the head-mountable apparatus via wireless communication, the processing unit further configured to obtain a request to determine the approximate user view direction, and based on the request, send an instruction for the sensor data the wireless communication interface to the head-mountable apparatus, where the processing unit is configured to receive the sensor data in response to sending the instruction. The processing unit can be configured to determine the approximate user view direction by determining, from sensor data comprising data from a camera, an angle of arrival of light received from the one or more modulated light sources. The processing unit can be configured to determine the approximate user view direction further based on a known direction the one or more light sensors are facing with respect to the head-mountable apparatus, and an approximate location of the head-mountable apparatus on the user's head. The processing unit can be further configured to perform a calibration function to determine an approximate location of the head-mountable apparatus on the user's head, and/or provide the generated information indicative of the determination of the approximate user view direction to an application executed by a computing device. The processing unit can be further configured to obtain information indicating a location of an object, and determine the user is looking at the object based, at least in part, on the determination of the approximate user view direction and the indicated location of the object. The processing unit can be configured to receive the sensor data by receiving sensor data for at least two photodiode measurements of received modulated light, and obtain the location information by obtaining information indicative of an identity of each of the one or more modulated light sources associated with the at least two photodiode measurements based on decoding the received modulated light. The at least two photodiode measurements can comprise at least a first measurement from a first photodiode and a second measurement from a second different photodiode, the at least two photodiode measurements taken during a measurement time. The processing unit can be configured to receive sensor data comprising at least one data type selected from the group consisting of decoded sensor data and modulated sensor data.

An example apparatus, according to the disclosure, comprises means for receiving sensor data generated by one or more light sensors of a head-mountable apparatus in response to detecting light from one or more modulated light sources, means for obtaining, for each of the one or more modulated light sources, location information of the respective modulated light source, means for determining an approximate user view direction based, at least in part, on the sensor data and the location information, and means for generating information indicative of the approximate user view direction.

The example apparatus can additionally include one or more of the following features. The means for receiving sensor data can include means for receiving the sensor data at a device separate from the head-mountable apparatus, and wherein the means for determining the approximate user view direction are included in the device. The apparatus can include means for receiving the sensor data from the head-mountable apparatus via wireless communication, means for obtaining a request to determine the approximate direction the user is looking, means for, based on the request, sending an instruction for the sensor data via wireless communication from the apparatus to the head-mountable apparatus. The means for determining the approximate direction the user is looking can comprise means for determining, from the sensor data, an angle of arrival of light received from the one or more modulated light sources. The apparatus may further comprise means for performing a calibration function to determine an approximate location of the head-mountable apparatus on the user's head.

A non-transitory computer-readable medium, according to the description, can have instructions embedded thereon for view direction determination, where the instructions comprising computer code for receiving sensor data generated by one or more light sensors of a head-mountable apparatus in response to detecting light from one or more modulated light sources, obtaining, for each of the one or more modulated light sources, location information of the respective modulated light source, determining an approximate user view direction based, at least in part, on the sensor data and the location information, and generating information indicative of the approximate user view direction.

The non-transitory computer-readable medium can additionally include one or more of the following features. The non-transitory computer-readable medium can comprise computer code for obtaining a request to determine the approximate direction the user is looking, and based on the request, sending an instruction for the sensor data via wireless communication to the head-mountable apparatus, where receiving the sensor data is in response to sending the instruction. The computer code for determining the approximate direction the user is looking can comprise computer code for determining, from the sensor data, an angle of arrival of light received from the one or more modulated light sources.

BRIEF DESCRIPTION OF DRAWINGS

Non-limiting and non-exhaustive aspects are described with reference to the following figures, wherein like reference numerals refer to like parts throughout the various figures unless otherwise specified.

FIGS. 2A-2B and 3A-3B are illustrations of scenarios in which an approximate direction a user is looking can be determined according to techniques described herein.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Figure 1:
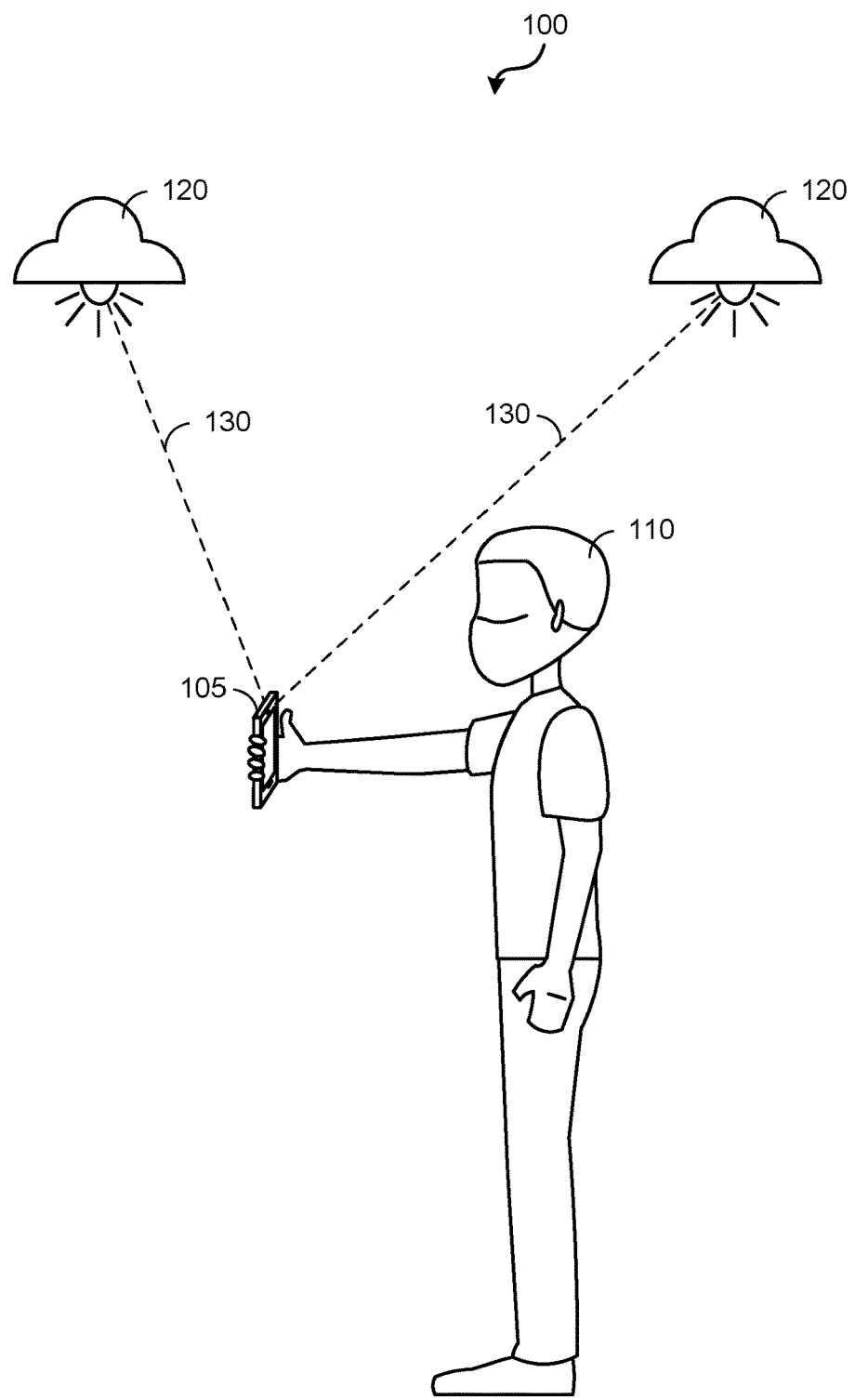
FIG. 1 is a simplified illustration of an example scenario in which VLC can be used to determine the location of the mobile device, according to an embodiment.

FIG. 1 is a simplified illustration of an example scenario 100 in which VLC can be used to determine the location of the mobile device 105. Here, the basic components involved include a mobile device 105 (held by a user 110), and one or more modulated light sources 120 with known locations.

Other scenarios may include a larger or smaller amount of modulated light sources 120, different types of modulated light sources 120, a larger number of mobile devices 105, etc.

The process of determining a location fix of the mobile device 105 using VLC-based positioning can proceed generally as follows. When the mobile device 105 determines that it needs to determine its location (e.g., when prompted for a location fix by an app and/or other function of the mobile device), it can use one or more light sensors (such as one or more cameras) to detect modulated light 130 from one or more modulated light sources 120. Based on information encoded in the modulated light 130 received from the modulated light sources 120, the mobile device 105 can determine its position and orientation in three spatial dimensions.

The modulated light sources 120 can play a dual role in such scenarios. These modulated light sources 120, which are typically light emitting diodes (LEDs) (but may utilize additional or alternative technologies for producing and modulating light), not only provide light for illumination, but also modulated light to communicate location information to the mobile device 105. The modulation can occur at frequencies high enough such that any light flicker is not perceivable by the human eye. In the case of LEDs, for example, light may be modulated at frequencies in the KHz range. In some embodiments, binary modulation is used so that energy efficiency of the modulated light source 120 is not compromised. This type of modulation can be produced, for example, by highly efficient boost converters that are used in pulse width modulated (PWM)-dimmable LED drivers.

The location information transmitted from the modulated light sources 120 to the mobile device 130 can vary, depending on desired functionality. In some embodiments, for example, the location information transmitted by a modulated light source 120 may comprise the location, and coordinates, of the modulated light source 120 in three-dimensional space. Additionally or alternatively, the location information of a modulated light source 120 may comprise an identifier of the modulated light source 120. This identifier can be used by the mobile device 105 (or another device to which the mobile device 105 sends the location information) to determine the position of the modulated light source 120, which may be stored in a database (or other data structure) linking the identifier of modulated light sources 120 to their respective known locations.

In some embodiments, known locations of the modulated light sources 120 may be stored by a server (not shown) and provided to the mobile device 105. This can be implemented in any of a variety of ways. For example, in some embodiments, a server may be maintained by a service provider, where the server stores the known locations of modulated light sources 120 of all buildings within a coverage region of the service provider. In other embodiments, different servers may be allocated to smaller regions. For example, a server may maintain the known locations of modulated light sources 120 for a single building or single campus. In some embodiments, these known locations may be provided to a mobile device 105 by the server when the mobile device 105 is determined to have entered, joined a local wireless network of, or come within a threshold proximity of the coverage region (building, campus, etc.) of a server. In other embodiments, these known locations may be provided, on-demand, when a mobile device 105 attempts to make a location fix. In this latter case, the mobile device 105 may detect one or more identifiers of one or more respective modulated light sources 120 via the modulated light 130, and provide the one or more identifiers to a server. The server can then reply back to the mobile device 105 with location information for the one or more modulated light sources 120. Alternatively, the server itself may calculate the location of the mobile device 105 and provide the calculated location to the mobile device 105.

As previously mentioned, however, there are drawbacks to traditional VLC-based positioning techniques. A location fix for the mobile device 105, for example, requires an unobstructed view to one or more modulated light sources 120. This can sometimes be a burden for smaller mobile devices, such as mobile phones, which are often kept in a user's pocket, purse, handbag, etc. when not interacted with by the user 110. Additionally, traditional VLC-based positioning techniques typically only determine location in a horizontal plane, thereby failing to provide additional information that can possibly be determined using VLC, such as position in the vertical dimension (the Z-axis) and/or orientation of the mobile device 105. That is, VLC has the capability of determining the 6 degrees of freedom (6DOF) of the mobile device 105, but traditional VLC-based positioning techniques typically do not provide such information.

Techniques described herein address these and other issues by providing a head-mounted apparatus that not only enables location determination, but also a determination of an approximate direction that a user is looking. This can be done by determining the 6DOF of a head-mountable apparatus, along with the position of the head-mountable apparatus on a user's head. As described in the embodiments that follow, the head-mountable apparatus may be communicatively coupled with a mobile device that calculates the approximate direction that the user is looking and/or may comprise a device that itself calculates the approximate direction that the user is looking. As a person of ordinary skill in the art will appreciate, different embodiments may be utilized to address different use cases.

FIGS. 2A-2B are illustrations of a scenario in which an approximate direction a user 110 is looking is determined, according to an embodiment. Here, as in FIG. 1, the scenario involves a mobile device 105 and modulated light sources 120 emitting modulated light 130. Here however, an additional head-mountable apparatus 210 is worn by a user 110, and the head-mountable apparatus 210 has one or more light sensors configured to detect the modulated light 130 emitted from modulated light sources 120. Using the information from the light sensors, and orientation of the head-mountable apparatus 210 can be determined. And, by knowing the position of the head-mountable apparatus 210 relative to the head of the user 110, an approximate direction 220 the user 110 is looking can be determined. (This may be in addition to determining a location of the head-mountable apparatus 210.) In general, the accuracy of the determined approximate direction 220 the user 110 is looking may increase with an increased number of detected modulated light sources 120 and/or number of light sensors on the head-mountable apparatus 210.

A calculation of an orientation or 6DOF of the head-mountable apparatus 210 can be made by not only extracting identification information from the modulated light 130, but also using a direction of arrival of the modulated light 130. Depending on desired functionality, the head-mountable apparatus 210 may utilize any of a variety of different sensors to determine the angle of arrival of the modulated light 130. For example, some embodiments may employ the use of a camera, which has a pixel array capable of providing spatial resolution for an angle of arrival determination. Accordingly, embodiments may utilize a relatively simple camera (or operate a relatively complex camera in a relatively simple mode) to enable the VLC functionality described herein. That is, the camera may be operated in a manner to provide sufficient spatial resolution and decoding of the modulated light, without employing more complex camera features for image processing and image quality, such as zoom, color processing, noise reduction, and the like. To help increase the field of view (FOV) of a camera, embodiments may utilize a fisheye lens (e.g., located at the top of the user's head, when the head-mountable apparatus is being worn by the user). Additionally or alternatively, multiple cameras may be implemented, depending on the spatial resolution desired. In some embodiments, for example, different cameras may be used on different sides of a user's head (e.g., at or near the user's ears), to help achieve desired spatial resolution.

Figure 8:
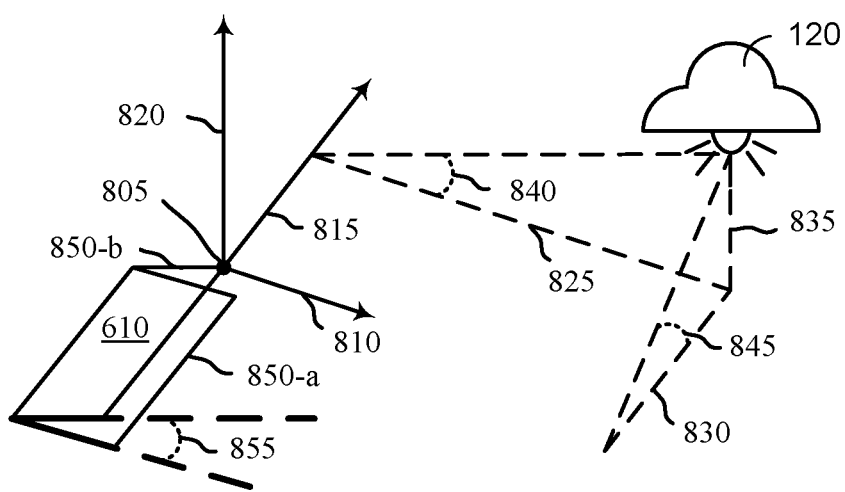
FIGS. 8 and 9 are geometric diagrams showing details regarding how an orientation of a head-mountable apparatus (or similar device) may be determined, according to an embodiment.
Figure 9:
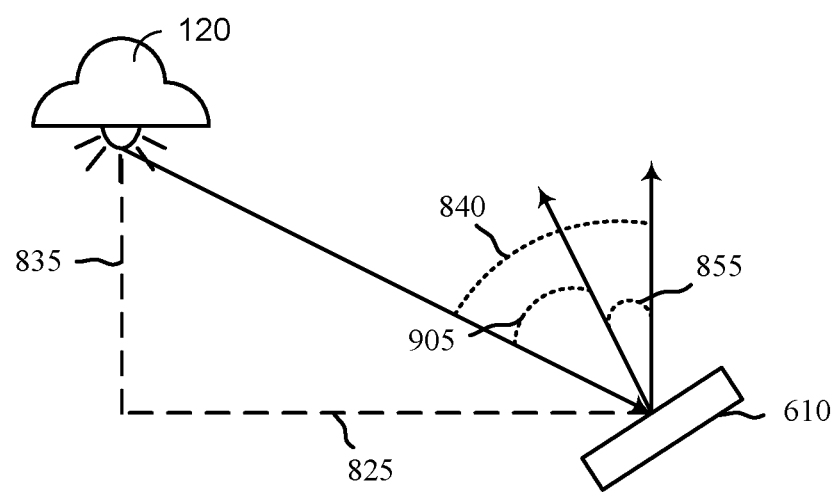

Some embodiments may utilize photodiodes in addition or as an alternative to utilizing one or more cameras. Photodiodes may be advantageous to help reduce the amount of power consumed by the head-mountable apparatus 210. To provide spatial resolution, however, the photodiodes can be mounted or otherwise positioned on the head-mountable apparatus 210 in different known directions such that, if a particular photodiode receives modulated light 130, the known position and orientation of the particular photodiode relative to the head-mountable apparatus 210 enables the angle of arrival of the modulated light 130 to be determined with respect to the head-mountable apparatus 210. The angle of arrival can be determined using any of a variety of techniques, depending on desired functionality. An example of one such technique is illustrated in FIGS. 8 and 9 and described in more detail below.

It can be noted that different types of head-mountable apparatuses may be utilized, depending on desired functionality. The embodiment shown in FIGS. 2A-2B illustrates a head-mountable apparatus 210 comprising headphones. Other embodiments may include, for example, earbuds, a head-mountable display (HMD), a virtual reality and/or augmented reality headpiece, a hat (or other article of clothing worn on the head), a stand-alone sensing device (that may be clipped or otherwise fastened to the head of the user 110 and/or an article of clothing worn thereon), etc. As such, not only may the head-mountable apparatus 210 include sensors (described in more detail below) capable of sensing the modulated light 130, but may also provide additional functionality. In the case of headphones, for example, the head-mountable apparatus 210 may provide the functionality of traditional headphones in addition to the ability to sense modulated light 130.

Figure 6:
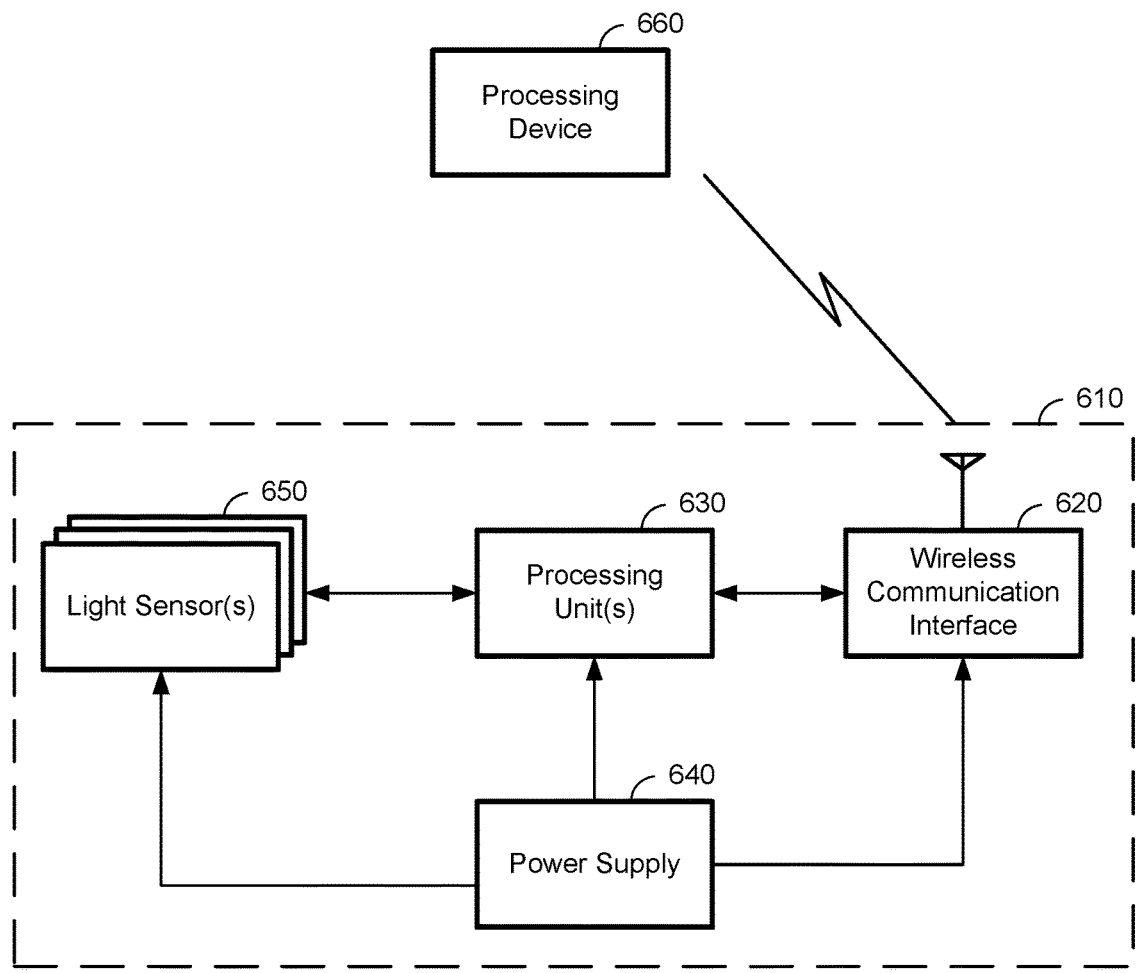
FIG. 6 is a block diagram illustrating basic components of a head-mountable apparatus as described herein.
Figure 7:
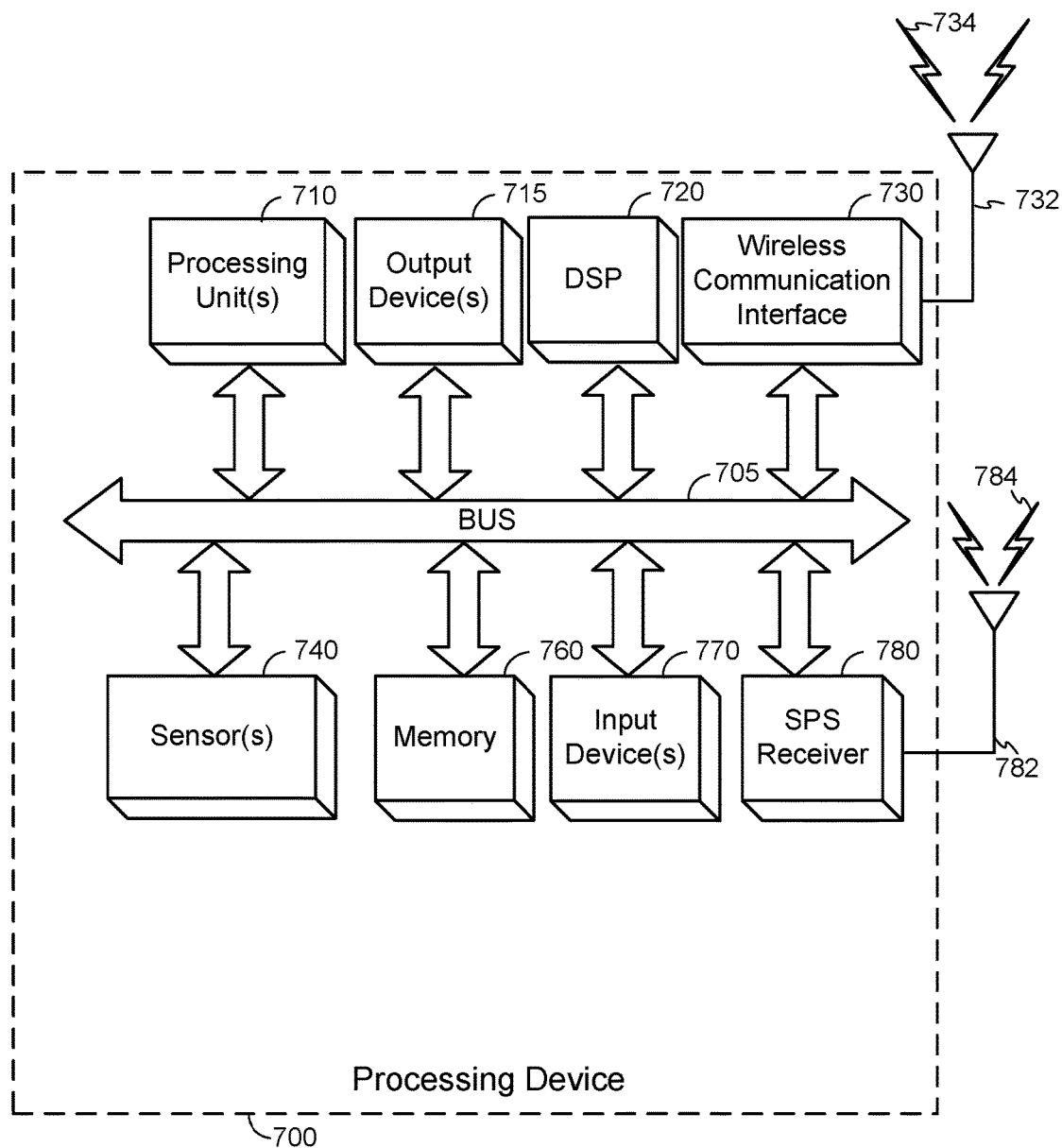
FIG. 7 is a block diagram of an embodiment of a processing device, which can be utilized in the embodiments described herein.

As previously mentioned, the light-sensing functionality of the head-mountable apparatus 210 can vary, depending on desired functionality. According to some embodiments, the head-mountable apparatus 210 may comprise a simple device capable of little more than sensing the modulated light 130 and providing sensor data to a separate processing device, such as the mobile device 105. Hardware components for such embodiments may be correspondingly simple, such as illustrated in FIG. 6 and described in more detail below. On the other hand, other embodiments may provide additional functionality and may be capable of determining an approximate direction 220 the user 110 is looking without the need to send the sensor data to a separate processing device. Hardware components for these embodiments may be correspondingly more complex. They can, for example, include some or all of the components of a processing device 700, such as illustrated in FIG. 7 and described in more detail below. As such, they may not communicate with a mobile device 105 (or other type of processing device), but may be a stand-alone device. As a person of ordinary skill in the art will appreciate, other embodiments may be configured differently.

In the scenario illustrated in FIGS. 2A-2B, the head-mountable apparatus 210 may be communicatively coupled with the mobile device 105 to determine the approximate direction 220 the user 110 is looking. In this example, the head-mountable apparatus 210 comprises one or more light sensors (such as cameras and/or photodiodes) configured such that, not only can the modulated light 130 from modulated light sources 120 be detected and decoded, but also an angle of arrival of the modulated light 130 can be determined. In this example, the head-mountable apparatus 210 can then send the sensor data, or some derivative thereof, to the mobile device 105 to determine the orientation of the head-mountable apparatus 210 and, correspondingly, the approximate direction 220 the user 110 is looking.

In this scenario, because the mobile device 105 may know its own location and three-dimensional space (using, for example, one or more of its own cameras to make a location fix using VLC-based positioning), the mobile device 105 may also know whether the user 110 is looking toward the mobile device 105. FIG. 2A illustrates how the user 110 may be looking in the direction of the mobile device 105, and may be determined (by the mobile device 105) as doing so based on a determination of an approximate direction 220 the user 110 is looking. At a different time, the user may be looking in a separate direction, as illustrated in FIG. 2B. The mobile device 105 may provide corresponding functionality, such as activating a display of the mobile device 105 when the mobile device 105 determines that the user is looking in the direction of the mobile device (as shown in FIG. 2A) and deactivating the display of the mobile device 105 when the mobile device 105 determines that the user is looking in a different direction (as shown in FIG. 2B).

Embodiments may vary in how broad or narrow the approximate direction 220 the user 110 is looking may be. This breadth (depicted as angle 225 in FIG. 2A) may depend on factors such as accuracy of the determined orientation of the head-mountable apparatus 210, desired functionality, user preferences, and the like. In some embodiments, the direction 220 may be considered fixed relative to the orientation of the head-mountable apparatus 210, based on how the head-mountable apparatus 210 is intended or expected to be worn.

Some embodiments may allow for calibration to determine the direction 220 the user is looking with respect to the orientation of the head-mountable apparatus 210. This can be done, for example, by asking the user to look at an object with a known location, and comparing the location and orientation of the head-mountable apparatus 210 with the known location. For instance, where the location of a mobile device 105 and the location and orientation of the head-mountable apparatus are known, a calibration function can be initiated at the mobile device or the head-mountable apparatus 210. Upon initiation of the calibration function, the user can be prompted to look at the mobile device 105 (as shown in illustrated in FIG. 2A). As part of the calibration function, the mobile device 105 (e.g., via a display of the mobile device 105) and/or the head-mountable apparatus 210 (e.g., via audio instructions) can prompt a user to perform this and/or other actions for calibration. (Headphones or earbuds, for example, could give the user 110 an audible prompt; an HMD could give the user a visual prompt; etc.) This can allow the mobile device 105, head-mountable apparatus 210, or other device determining the direction 220 the user 110 is looking (which can vary, depending on desired functionality, as previously discussed) to more accurately determine the direction 220 the user 110 is looking with respect to the orientation of the head-mountable apparatus 210.

Figure 3B:
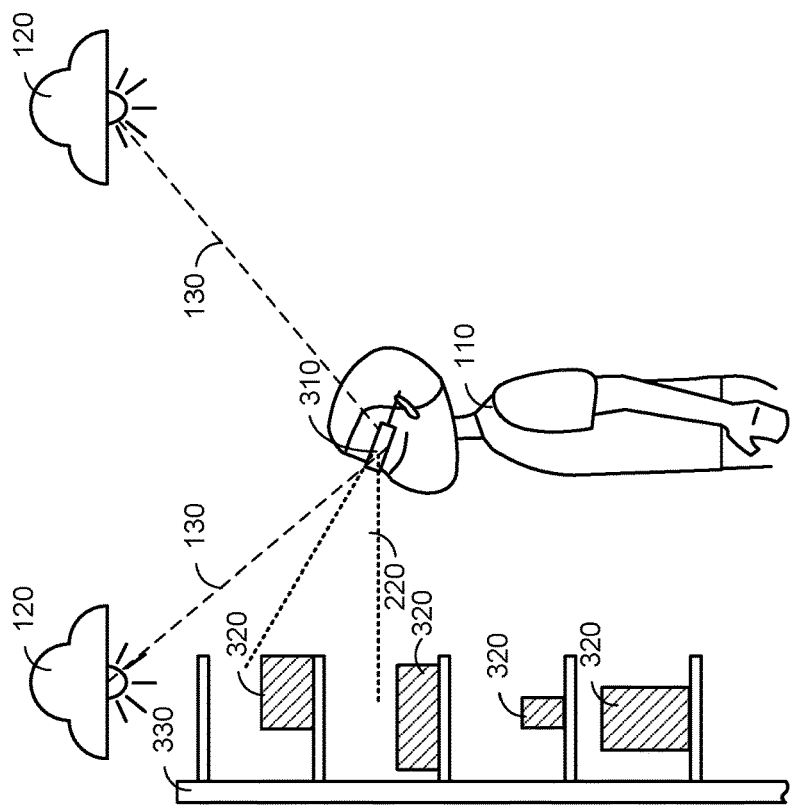
Figure 3A:
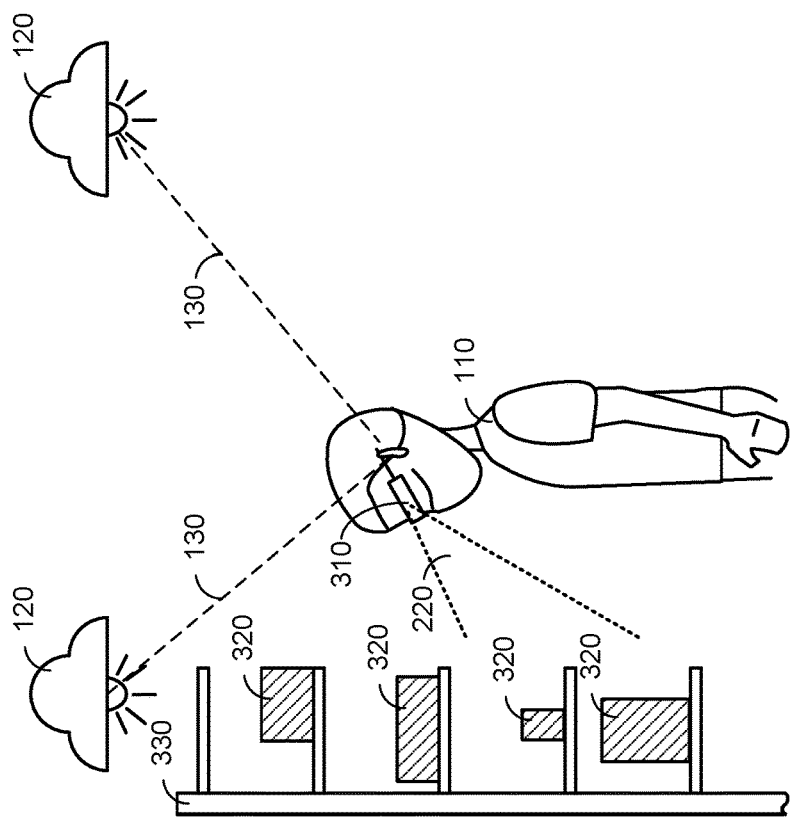

FIGS. 3A-3B illustrate another are illustrations of the scenario in which an approximate direction a user 110 is looking is determined, according to an embodiment. Here, a head-mountable apparatus 310 has a different form factor, comprising a head-mounted display (HMD), which may be capable of showing information to a user via a display. One or more light sensors may be outward and/or upward facing to help capture modulated light 130 and determine the direction 220 in which a user 110 is looking (which may be in addition to providing a location fix of the head-mountable apparatus 310).

Depending on desired functionality, and as previously described, the head-mountable apparatus 310 may or may not be communicatively coupled with another device to determine the direction 220 in which a user 110 is looking. That is, in some embodiments the head-mountable apparatus 310 may comprise a processing unit configured to receive sensor data indicative of information received via the modulated light 130 and determine the approximate direction 220 the user 110 is looking based, at least in part, on the sensor data and location information (e.g., information regarding the location of the modulated light source(s) 120. In some embodiments, the head-mountable apparatus 310 may send the sensor data to another device (e.g., a mobile phone or other mobile device which may be carried by the user 110, a remote server, etc.) with which the head-mountable apparatus 310 is communicatively connected, and the other device may determine the approximate direction 220 the user 110 is looking.

Of course, applications for the functionality described herein may vary. The scenario illustrated in FIGS. 2A-2B illustrate functionality enabling the determination that a user 110 is looking in the direction of a mobile device 105 held by the user 110, which may have calculated its own location. In the scenario illustrated in FIGS. 3A-3B, the user may be in a warehouse or retail store looking at items 320 on shelving unit 330. If the locations of the items 320 are known (e.g., by the head-mountable apparatus 310 and/or a device communicatively coupled therewith), then it may be determined which items 320 the user 110 may be looking at. Such functionality may be helpful when assisting the user 110 to find a particular item 320 and/or provide information regarding items 320 (e.g., via a display of an HMD) at which the user may be looking.

Figure 4:
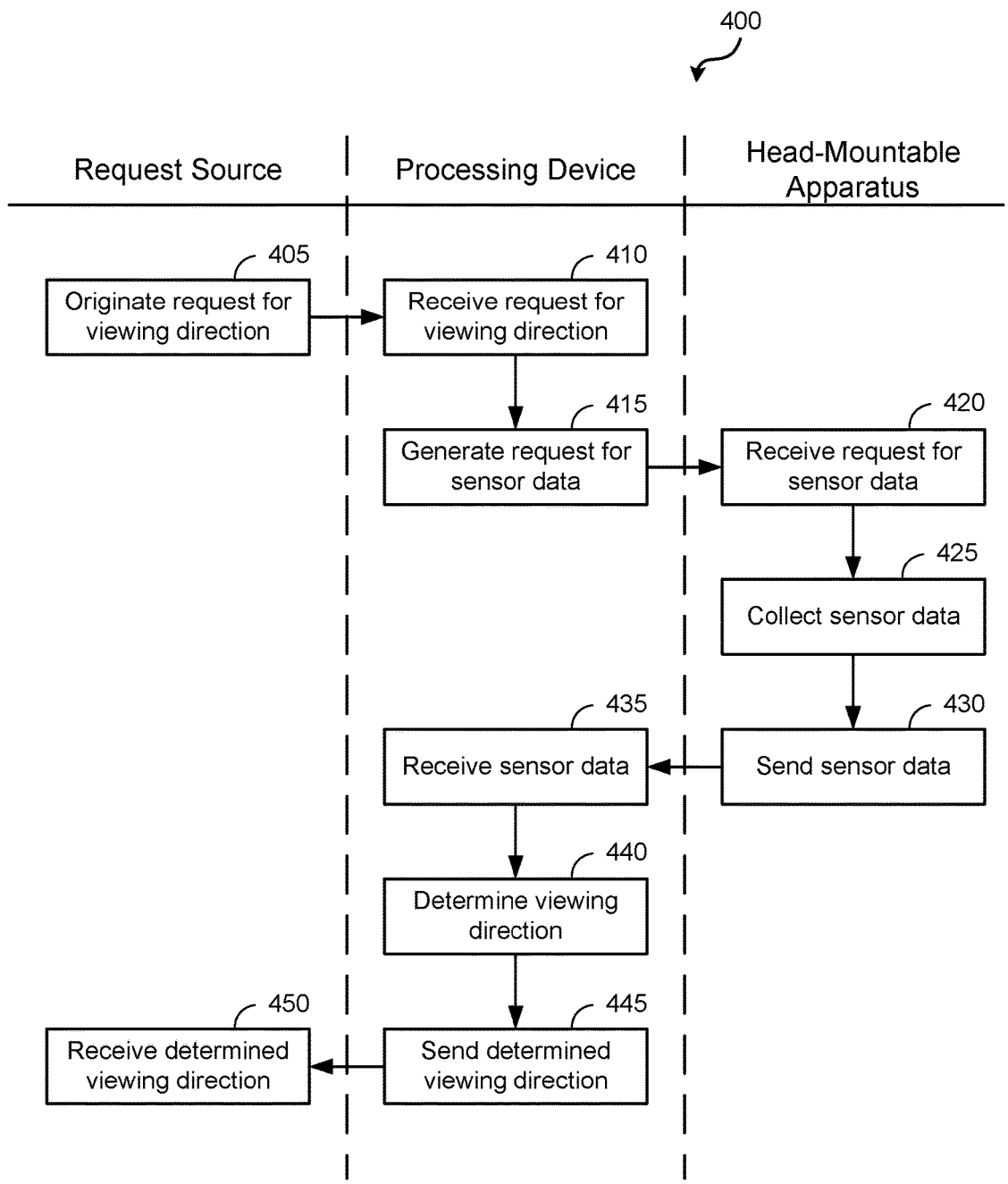
FIG. 4 is a swim-lane diagram, illustrating how a head-mountable apparatus may communicate with a separate processing device to provide a determination of a viewing direction of a user, according to an embodiment.

FIG. 4 is a swim-lane diagram 400, generally illustrating how a head-mountable apparatus (e.g., the head-mountable apparatus 210 and/or 310 of FIGS. 2A-2B and 3A-3B, respectively) may communicate with a separate processing device (e.g., a mobile phone to which the head-mountable apparatus is communicatively coupled) to provide a determination of a viewing direction of a user, according to an embodiment. This method, which provides on-demand light sensing, can be particularly useful in scenarios in which the head-mountable apparatus and the processing device communicate wirelessly (e.g., via a local wireless technology such as Bluetooth®, near-field communication (NFC), etc.), where conserving battery life of the head-mountable apparatus and/or the processing device is a concern.

At block 405 a request for the viewing direction of a user is generated by a request source. In some instances, the request source may be external to the processing device and/or head-mountable apparatus, such as a remote server or other device. In some instances, the request may be generated by an application (or other function) executed by the processing device (e.g., an app running on a user's mobile phone, where the mobile phone is the processing device). Depending on desired functionality of the request source, such requests may be generated based on a schedule (e.g., periodically, at certain times, etc.), a triggering event (e.g., when the processing device and/or head-mountable apparatus is determined to be within a threshold distance of an object, at a certain location, etc.), and the like.

At block 410, the request for the viewing direction is received by the processing device. Where the request source is an application executed by the processing device, the request may be received by another function (e.g., lower-level software and/or hardware) of the processing device. As a result of receiving the request, a request for sensor data is generated at block 415. In some instances, the request for sensor data 415 may be generated if a current viewing direction is unknown and/or has not been determined for a threshold amount of time.

At block 420, the request for sensor data is received by the head-mountable apparatus, which then collects the sensor data at block 425. As previously noted, because the head-mountable apparatus can collect sensor data on demand (e.g., upon receiving a request for sensor data), it can preserve power by collecting data only when it receives a request for such data. In other words, the head-mountable apparatus—or at least the light-sensing functionality of the head-mountable apparatus—may operate on relatively low power when not sampling data from light sensors, leaving the hardware responsible for collecting the sensor data in a low-power or off mode until sensor data is requested. That said, alternative embodiments may comprise a head-mountable apparatus configured to collect sensor data more frequently (even before a request for such data is requested), which may allow the head mountable apparatus to send sensor data to the processing device more quickly, which may be desirable in some circumstances. In any case, the sensor data is sent by the head-mountable apparatus at block 430 and received by the processing device at block 435.

At block 440, the viewing direction is determined by the processing device. As previously noted, the viewing direction may be determined based on angle of arrival information in the sensor data, along with location information of the one or more modulated light sources. In some embodiments, information extracted from the sensor data (e.g., encoded in the modulated light) can provide an indication of the identity of the one or more modulated light sources, and the processing device may determine the location of the one or more modulated light sources from information stored locally on the processing device, and/or via sending a request to a location server or other remote device for such information. At block 445, the processing device sends the determined viewing direction to the request source, which receives the determined viewing direction at block 450. The request source (e.g., an application, remote device, etc.) can then provide corresponding functionality in response to receiving the determined viewing direction.

Figure 5:
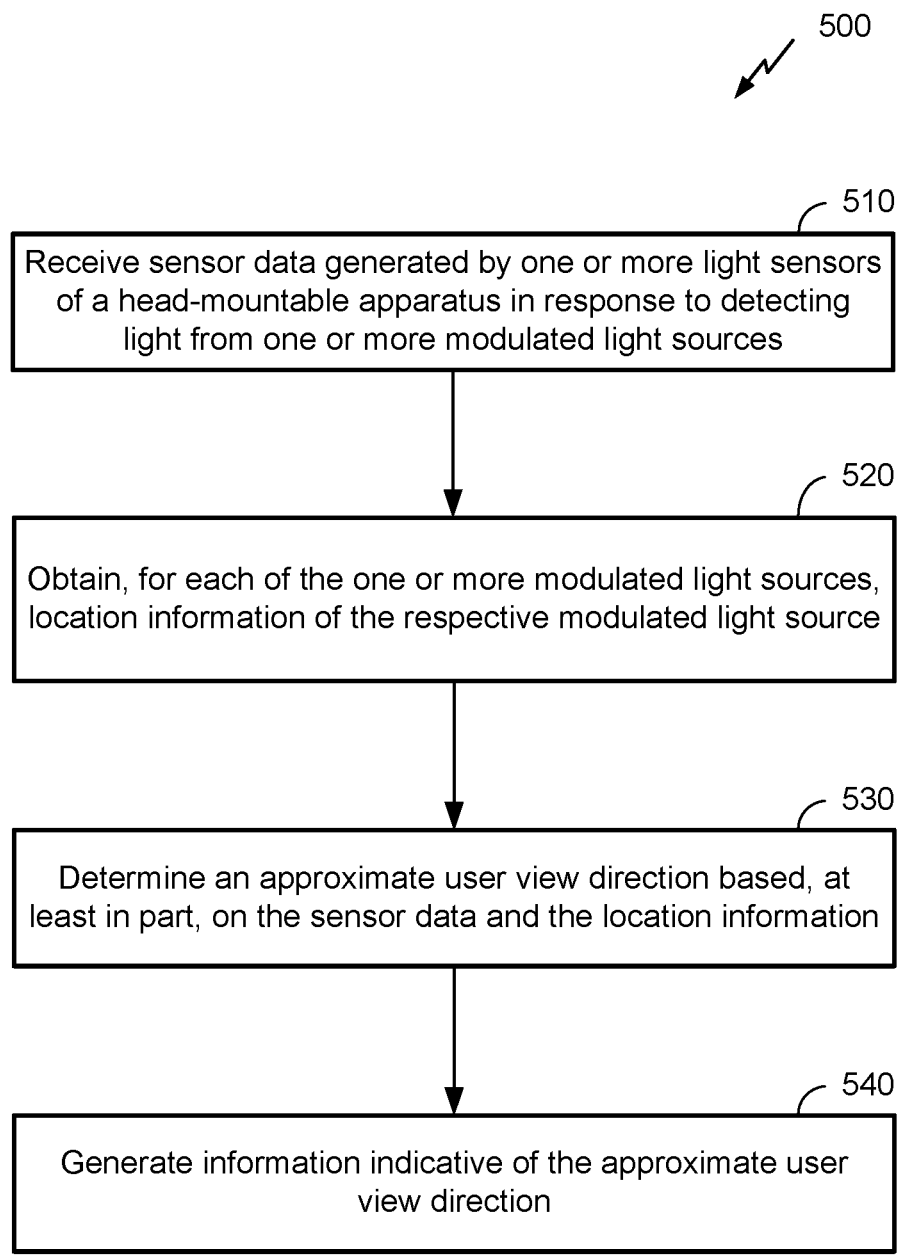
FIG. 5 is a flow diagram illustrating a method of viewing direction determination, according to an embodiment.

FIG. 5 is a flow diagram 500 illustrating a method 500 of viewing direction determination, according to an embodiment. As with other figures provided herein, FIG. 5 is a non-limiting embodiment; other embodiments may vary from the functionality illustrated. A person of ordinary skill in the art will appreciate that functions illustrated in the blocks in FIG. 5 may be rearranged such that the blocks are combined, separated, rearranged, etc. Means for performing the functionality of one or more of the blocks illustrated in FIG. 5 may comprise software and/or hardware components of a head-mountable apparatus and/or mobile device, such as the mobile device 105 of FIG. 7 and/or head-mountable apparatus of FIG. 6, which are described in more detail below.

The functionality at block 510 comprises receiving sensor data generated by one or more light sensors of a head-mountable apparatus in response to detecting light from one or more modulated light sources. As previously discussed, according to some embodiments, a processing device comprising a device separate from the head-mountable apparatus may receive the sensor data. In some embodiments, this may be received via wireless communication. According to some embodiments, the sensor data may be received by a processing unit within the head-mountable apparatus from the one or more light sensors. Means for performing the functionality at block 510 may comprise processing unit(s) 630, wireless communication interface 620, and/or light sensor(s) 650, of a head-mountable apparatus 610 illustrated in FIG. 6 and described below; and/or processing unit(s) 710, wireless communication interface 730, sensor(s) 740, bus 705, memory 760, and/or other components of a processing device 700 illustrated in FIG. 7 and described below.

At block 520, for each of the one or more modulated light sources, location information of the respective modulated light source is obtained. As noted above, the location information may be maintained at a location server and/or stored locally in memory of the mobile device and/or head-mountable apparatus. In some embodiments, the location of each of the one or more modulated light sources may be encoded in the modulated light emitted by the respective modulated light source, where obtaining the location information comprises extracting it from the sensor data. Means for performing the functionality at block 520 may comprise processing unit(s) 630, wireless communication interface 620, and/or light sensor(s) 650, of a head-mountable apparatus 610 illustrated in FIG. 6 and described below; and/or processing unit(s) 710, wireless communication interface 730, sensor(s) 740, bus 705, memory 760, and/or other components of a processing device 700 illustrated in FIG. 7 and described below.

The functionality at block 530 comprises determining an approximate user view direction based, at least in part, on the sensor data and the location information. As indicated in the embodiments described herein, the user view direction can be indicative of a direction in which a user of the head-mountable apparatus is looking. Depending on desired functionality, the determining the approximate user view may be made by the processing unit(s) of the head-mountable apparatus or a separate processing device. As noted above, the accuracy of the determination may be based on any of a variety of factors, such as the accuracy of the sensor data and/or location information, the number of light sensors and/or one or detected modulated light sources, a user preference, application setting, and the like. Means for performing the functionality at block 530 may comprise processing unit(s) 630, wireless communication interface 620, and/or light sensor(s) 650, of a head-mountable apparatus 610 illustrated in FIG. 6 and described below; and/or processing unit(s) 710, wireless communication interface 730, sensor(s) 740, bus 705, memory 760, and/or other components of a processing device 700 illustrated in FIG. 7 and described below.

At block 540, information indicative of the approximate user view direction is generated. The type of information generated may depend on a requesting source. The information may be generated to respond to a request (e.g., from an application and/or separate device) and/or may be generated and stored by the device determining the user view direction. As such, the information may be stored by the device, provided to an application executed by the device, and/or sent to a remote device accordingly, according to embodiments. Means for performing the functionality at block 540 may comprise processing unit(s) 630, wireless communication interface 620, and/or light sensor(s) 650, of a head-mountable apparatus 610 illustrated in FIG. 6 and described below; and/or processing unit(s) 710, wireless communication interface 730, sensor(s) 740, bus 705, memory 760, and/or other components of a processing device 700 illustrated in FIG. 7 and described below.

Embodiments may include one or more additional functions, depending on desired functionality. For example, in an embodiment where the method 500 is performed by a processing device separate from the a head-mountable apparatus, the method 500 may further comprise obtaining a request to determine the approximate user view direction and, based on the request, send an instruction for the sensor data (e.g., via wireless communication) from a device to a head-mountable apparatus, where receiving the sensor data is in response to sending the instruction. In some embodiments, the one or more light sensors may comprise a camera, and the determining the approximate direction the user is looking may comprise determining, from the sensor data, an angle of arrival of light received from the one or more modulated light sources. In some embodiments, the sensor data received at the mobile device can include decoded sensor data and/or modulated sensor data. That is, depending on desired functionality, decoding of the modulated light may occur at the mobile device or before the mobile device receives the data (e.g., at the one or more light sensors).

On the other hand, in some embodiments, determining the approximate direction may be based on a known direction the one or more light sensors are facing with respect to the head-mountable apparatus and an approximate location of the head-mountable apparatus on the user's head. For example, according to some embodiments, receiving the sensor data can include receiving sensor data for at least two photodiode measurements of received modulated light, and obtaining location information may include obtaining information indicative of an identity of each of the one or more modulated light sources associated with the at least two photodiode measurements based on decoding the received modulated light. These photodiode measurements may be, for instance, light measurements taken from first and second photodiodes during a measurement time. (Here, the "measurement time" can mean that the at least two photodiode measurements are taken at substantially the same time, or within a time interval short enough to capture the view direction with a desired accuracy.) The received modulated light may include modulated light from an LED, and the first and second photodiodes may be configured to detect LED light (e.g., configured to detect light of bandwidth(s) generated by LEDs).

As previously noted, embodiments may further determine an object at which the user may be looking. For example, the method 500 may further comprise obtaining information indicating a location of an object and determining the user is looking at the object. The determination may be based, at least in part, on the determination of the approximate direction the user is looking and the indicated location of the object.

FIG. 6 is a block diagram illustrating basic components of a head-mountable apparatus 610 as described herein. Such components include light sensor(s) 650, processing unit(s) 630, wireless communication interface 620, and a power supply 640, which may be housed in a body configured to be worn on a user's head when in use. As indicated in some embodiments described herein above, the head-mountable apparatus 610 may be in wireless communication with a processing device 660 (e.g., to provide the functionality described in FIGS. 4 and/or 5), which, in some embodiments, may comprise a mobile device such as a mobile phone.

Here, the light sensors may comprise one or more cameras and/or photodiodes, which may be located on the head-mountable apparatus 610 in a manner to help maximize special resolution and/or field of view while minimizing the likelihood that sensed light will be obstructed (e.g., by a user's hair, hat, etc.).

The power supply 640 may comprise a power source such as a battery. Features such as capacity, size, and shape of the power supply 640 may be determined by factors such as manufacturing concerns, cost, weight, etc. In alternative embodiments (not shown), the head-mountable apparatus 610 may have a wired connection with the processing device 660, in which case the head-mountable apparatus 610 may receive some or all of its power via the processing device 660.

The processing unit(s) 630 and/or wireless communication interface 620 may enable the functionality of a head-mountable apparatus 610 described in the embodiments above. Additional details regarding the processing unit(s) 630 and/or wireless communication interface 620 may be similar to those of the processing unit(s) 710 and/or wireless communication interface 730 of FIG. 7, respectively, which are described in more detail below.

FIG. 7 is a block diagram of an embodiment of a processing device 700, which can be utilized in the embodiments described herein. As previously noted, a head-mountable apparatus may be communicatively coupled with a processing device 700, in which case the processing device may correspond with the processing device of FIG. 4, the processing device 660 of FIG. 6, and/or the mobile device 105 of FIGS. 1 and 2A-2B. In other embodiments, the head-mountable apparatus may itself determine a viewing direction of a user, in which case the head-mountable apparatus may not be communicatively coupled with a separate processing device, and/or the head-mountable apparatus may include one or all components of the processing device 700 illustrated in FIG. 7.

It should be noted that FIG. 7 is meant only to provide a generalized illustration of various components, any or all of which may be utilized as appropriate. In other words, because processing devices can vary widely in functionality, they may include only a portion of the components shown in FIG. 7. It can be noted that, in some instances, components illustrated by FIG. 7 can be localized to a single physical device and/or distributed among various devices in communication with each other (e.g., a head-mountable apparatus and separate mobile device), which may be disposed at different physical locations.

The processing device 700 is shown comprising hardware elements that can be electrically coupled via a bus 705 (or may otherwise be in communication, as appropriate). The hardware elements may include a processing unit(s) 710 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 7, some embodiments may have a separate DSP 720, depending on desired functionality. The processing device 700 also may comprise one or more input devices 770, which may comprise without limitation one or more touch screens, touch pads, microphones, buttons, dials, switches, and/or the like; and one or more output devices 715, which may comprise without limitation, one or more displays, light emitting diode (LED)s, speakers, and/or the like.

The processing device 700 might also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi® device, a WiMax® device, cellular communication facilities, etc.), and/or the like. The wireless communication interface 730 may permit data to be communicated with a head-mountable apparatus, a network, a location server, and/or any other electronic devices described herein, for example. The communication can be carried out via one or more wireless communication antenna(s) 732 that send and/or receive wireless signals 734.

Depending on desired functionality, the wireless communication interface 730 may comprise one or more transceivers to communicate with base transceiver stations, Wi-Fi access points (APs), wireless beacons, and/or other such transceivers. These different data networks may comprise various network types. A wireless wide area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ long-term evolution (LTE), LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The wireless communication interface 730 may further comprise hardware and/or software components for implementing one or more data connectivity searchers as described in the embodiments above. The implementation and/or functionality of such a data connectivity searcher may vary depending on the wireless technology involved (LTE, GSM, etc.), applicable protocols and/or standards, manufacturing concerns, and/or other factors.

The processing device 700 can further include sensor(s) 740. Not only may the sensor(s) 740 comprise the light sensor(s) described herein above, but they may additionally or alternatively comprise, without limitation, one or more accelerometer(s), gyroscope(s), camera(s), magnetometer(s), altimeter(s), microphone(s), proximity sensor(s), and the like. Sensor(s) 740 may provide positioning and/or other functionality that may complement the positioning and/or viewing determination functionality described herein.

Embodiments of the mobile device may also include a satellite positioning system (SPS) receiver 780 capable of receiving signals 784 from one or more SPS satellites using an SPS antenna 782. In some embodiments, such satellite-based positioning can be utilized to complement the terrestrial transceiver-based positioning techniques described herein. The SPS receiver 780 can extract a position of the mobile device, using conventional techniques, from SPS satellites of an SPS system, such as GNSS (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 780 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The processing device 700 may further include and/or be in communication with a memory 760. The memory 760 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Among other things, the memory 760 may be used to store location information and/or viewing direction information as described herein.

The memory 760 of the processing device 700 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the method 600 of FIG. 6, might be implemented as code and/or instructions executable by the processing device 700 (and/or a processing unit within a processing device 700). In an aspect, then, such code and/or instructions can be used to configure and/or adapt a general purpose computer (or other device) to perform one or more operations in accordance with the described methods.

As discussed herein, an angle of arrival can be determined using any of a variety of techniques, which may be based on light detection by a light sensor (e.g., a photodiode and/or camera) and implemented by processing unit(s) 630 of a head-mountable apparatus 610 and/or processing unit(s) 710 of a processing device 700 (as illustrated in FIGS. 6 and 7, respectively, and described above).

Using a head-mountable apparatus (e.g., the head-mountable apparatus 610 of FIG. 6) as an example, an embodiment for determining an angle of arrival may include estimating a relative angle of arrival for each light signal (received by light sensor(s) 650), a relative angle of arrival of the light signal with respect to a coordinate system of the head-mountable apparatus. The relative angle of arrival of a modulated light signal may be estimated, in some cases, by determining a position of an illuminated region captured by an image sensor illuminated by a light source 120. The illuminated region may be defined as an array of pixels within the image sensor, and may in some cases be specified in terms of pixel indices. A centroid of the illuminated region (e.g., a location $(x_0, y_0)$), may be found relative to the image sensor's coordinate system, which may also be considered the coordinate system of the head-mountable apparatus. The image sensor's coordinate system may be defined by a pair of axes centered at the midway pixel along the width and the length of the image sensor. For example, if the sensor is 480 pixels wide and 640 pixels long, then the coordinate axes may be centered at the pixel index pair (240, 320). If, for instance, the centroid of the identified region of the image is at pixel indices (250, 335) then the location of the region is given by $(x_0, y_0)=(10,15)$. In general, if the pixel indices are $(p_x, p_y)$ and the center of the sensor is at pixel indices $(c_x, c_y)$, the location of the region is $(x_o, y_o)=(p_x, p_y)-(c_x, c_y)$. A pair of angles $(\omega_x, \omega_y)$ may then be determined as a function of the centroid $(x_0, y_0)$. This pair of angles determines the angle of arrival of a modulated light signal received by the head-mountable apparatus, expressed in terms of the coordinate system of the head-mountable apparatus, which can be a three dimensional coordinate system wherein the axis perpendicular to the plane that the head-mountable apparatus lies in is the Z-axis and the X and Y axes span the plane that the head-mountable apparatus lies in and coincide with the image sensor's coordinate axes. For example, if the half of the field of view (FOV) angle is denoted by $\theta_{half}$ and the screen resolution in pixels is denoted by $X_{res}$ by $Y_{res}$, then the mapping between the centroid $(x_0, y_0)$ and the relative angle of arrival $(\omega_x, \omega_y)$ of a light signal may be given by the equations:

$$\omega_x = \arctan\left(\frac{2x_0}{X_{res}}\tan(\theta_{half})\right), \quad \omega_y = \arctan\left(\frac{2y_0}{Y_{res}}\tan(\theta_{half})\right)$$

The measurements of an orientation of the head-mountable apparatus may then be acquired using an orientation sensor. In some cases, the orientation sensor may include a gyroscope or an accelerometer of the head-mountable apparatus. The orientation determination module 710 may report a pair of angles $(\theta_r, \theta_y)$ which represent the angles of rotation (or orientation) of the head-mountable apparatus with respect to a reference (or absolute) coordinate system. For example, if gyroscope or accelerometer sensors are used, the angles ($\theta_x$, $\theta_y$) would represent the pitch and roll of the head-mountable apparatus relative to the earth's coordinate system.

According to some embodiments, the absolute angle of arrival of each modulated light signal with respect to the reference coordinate system (e.g., the earth's coordinate system) may then be determined. The absolute angle of arrival of a modulated light signal may be estimated, in some cases, by adjusting the relative angle of arrival with the orientation angle as measured by one or more orientation sensors (e.g., a gyroscope, accelerometer, magnetometer, and/or the like). This absolute angle of arrival can be used to determine the orientation of the head-mountable apparatus, based on a known orientation of the light sensor with respect to the head-mountable apparatus.

FIGS. 8 and 9 show further details regarding how an orientation of a head-mountable apparatus (or similar device) may be determined, according to an embodiment.

FIG. 8 provides a diagram 800 illustrating an exemplary position 805 of a head-mountable apparatus 610. The position 805 of the head-mountable apparatus 610 may be defined at least in part based on the location of a modulated light source 120. Given a Cartesian reference system having an x-axis 810, y-axis 815, and z-axis 820, the modulated light source 120 may be located a distance 825 ($d_x$), distance 830 ($d_y$) and distance 835 ($d_z$) from the head-mountable apparatus 610. The height ($d_z$) of the modulated light source 120 with respect to the head-mountable apparatus 610 may be defined by a pair of angles 840, 845 ($\varphi_x$, $\varphi_y$) with respect to the x-axis 810 and the y-axis 815. The pair of angles 840, 845 ($\varphi_x$, $\varphi_y$) represent an absolute angle of arrival of a light signal received by the head-mountable apparatus 610 from the modulated light source 120. These angles 840, 845 ($\varphi_x$, $\varphi_y$) may be determined based on the relative angle of arrival and orientation sensors (e.g., accelerometer, gyroscope, magnetometer, etc.) as discussed above. The location of the modulated light source 120 may be identified in terms of its height 835 ($d_z$) with respect to the head-mountable apparatus 610 (e.g., with respect to the position 805) and the distances $d_x$ and $d_y$.

As shown in FIG. 8, the head-mountable apparatus 610 may have an orientation 850-a in which its image sensor or the like is aligned squarely with the Cartesian reference system defined by the x-axis 810, y-axis 815, and z-axis 820. However, in some cases, the head-mountable apparatus 610 may have an orientation 850-b that is rotated with respect to one or more of the axes. By way of example, the illustrated orientation 850-b is rotated with respect to the x-axis 810 by an angle 855 ($\theta_r$). When a head-mountable apparatus 610 is rotated with respect to a position 805 in the Cartesian reference system, its orientation may be used to determine the absolute angle of arrival of a light signal received by the head-mountable apparatus 610 from the modulated light source 120. This is described in greater detail with reference to FIG. 9.

FIG. 9 provides a diagram 900 illustrating an exemplary orientation of the head-mountable apparatus 610 with respect to the x-axis of the Cartesian reference system defined in FIG. 8. In particular, the head-mountable apparatus 610 may be rotated by an angle 855 ($\theta_x$) with respect to the x-axis. The angle 855 ($\theta_x$) may be determined using an orientation sensor of the head-mountable apparatus 610, such as an accelerometer or a gyroscope. The angle 855 ($\theta_x$; i.e., the angle of rotation about the x-axis) may cause the light signal received from the modulated light source 120 to be received by an image sensor of the head-mountable apparatus 610 at a relative angle of arrival 905 ($\omega_x$). In such a case, the absolute angle of arrival 840 ($\varphi_x$) may be obtained using the previously disclosed technique for obtaining the relative angle of arrival and adjusting the angle with measurements from orientation sensors with regard to an absolute coordinate system. If the head-mountable apparatus 610 were to be rotated about the y-axis of the Cartesian reference system defined in FIG. 8, the absolute angle of arrival 845 ($\varphi_y$) may be obtained in a similar manner.

Additional details regarding the determination of the orientation of a device using modulated light sources can be found in U.S. patent application Ser. No. 13/923,908 entitled "Determining of Positioning Information of a Mobile Device Using Modulated Light Signals," which is hereby incorporated by reference in its entirety for all purposes.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of view direction determination, the method comprising: obtaining, at a mobile device configured to receive sensor data generated by one or more light sensors of a head-mountable apparatus via wireless communication, a request to determine an approximate user view direction, wherein: the approximate user view direction comprises an approximate field of view of a user wearing the head-mountable apparatus, and the sensor data is generated by the one or more light sensors in response to detecting light from one or more modulated light sources; based on the request to determine the approximate user view direction, sending a request for the sensor data via wireless communication from the mobile device to the head-mountable apparatus; receiving, in response to sending the request for the sensor data, the sensor data; obtaining, for each of the one or more modulated light sources, location information of the respective modulated light source; determining, with a processing unit of the mobile device, the approximate user view direction based, at least in part, on the sensor data and the location information; and generating, with a processing unit, information indicative of the approximate user view direction.

2. The method of claim 1, wherein:
the one or more light sensors comprises a camera; and
determining the approximate user view direction comprises determining, from the sensor data, an angle of arrival of light received from the one or more modulated light sources.

3. The method of claim 1, wherein determining the approximate user view direction is based on:
a known direction the one or more light sensors are facing with respect to the head-mountable apparatus, and
an approximate location of the head-mountable apparatus on the user's head.

4. The method of claim 1, further comprising performing a calibration function to determine an approximate location of the head-mountable apparatus on the user's head.

5. The method of claim 1, further comprising providing the generated information indicative of the determination of the approximate user view direction to an application executed by a computing device.

6. The method of claim 1, further comprising:
obtaining information indicating a location of an object; and
determining the user is looking at the object based, at least in part, on the determination of the approximate user view direction and the indicated location of the object.

7. The method of claim 1, wherein receiving the sensor data comprises receiving, at the mobile device, sensor data for at least two photodiode measurements of received modulated light, wherein obtaining the location information comprises obtaining information indicative of an identity of each of the one or more modulated light sources associated with the at least two photodiode measurements based on decoding the received modulated light.

8. The method of claim 7, wherein the at least two photodiode measurements comprise at least a first measurement from a first photodiode and a second measurement from a second, different photodiode, the at least two photodiode measurements taken during a measurement time, wherein the received modulated light includes received modulated light emitting diode (LED) light and wherein the first photodiode and the second photodiode are configured to detect the LED light.

9. The method of claim 7, wherein the sensor data received at the mobile device comprises at least one data type selected from the group consisting of decoded sensor data and modulated sensor data.

10. A mobile device enabling view direction determination, the mobile device comprising: a wireless communication interface configured to receive sensor data generated by one or more light sensors of a head-mountable apparatus via wireless communication, wherein the sensor data is generated in response to detecting light from one or more modulated light sources; a memory; and a processing unit communicatively coupled with the wireless communication interface and the memory and configured to: obtain a request to determine an approximate user view direction, wherein the approximate user view direction comprises an approximate field of view of a user wearing the head-mountable apparatus; based on the request to determine the approximate user view direction, send a request for the sensor data via wireless communication from the mobile device to the head-mountable apparatus; receive, via the wireless communication interface and in response to sending the request for the sensor data, sensor data generated by one or more light sensors of the head-mountable apparatus; obtain, for each of the one or more modulated light sources, location information of the respective modulated light source; determine the approximate user view direction based, at least in part, on the sensor data and the location information; and generate information indicative of the approximate user view direction.

11. The mobile device of claim 10, wherein the processing unit is configured to determine the approximate user view direction by determining, from sensor data comprising data from a camera, an angle of arrival of light received from the one or more modulated light sources.

12. The mobile device of claim 10, wherein the processing unit is configured to determine the approximate user view direction further based on:
a known direction the one or more light sensors are facing with respect to the head-mountable apparatus, and
an approximate location of the head-mountable apparatus on the user's head.

13. The mobile device of claim 10, wherein the processing unit is further configured to perform a calibration function to determine an approximate location of the head-mountable apparatus on the user's head.

14. The mobile device of claim 10, wherein the processing unit is further configured to provide the generated information indicative of the determination of the approximate user view direction to an application executed by a computing device.

15. The mobile device of claim 10, wherein the processing unit is further configured to:
obtain information indicating a location of an object; and
determine the user is looking at the object based, at least in part, on the determination of the approximate user view direction and the indicated location of the object.

16. The mobile device of claim 10, wherein the processing unit is configured to:
receive the sensor data by receiving sensor data for at least two photodiode measurements of received modulated light; and
obtain the location information by obtaining information indicative of an identity of each of the one or more modulated light sources associated with the at least two photodiode measurements based on decoding the received modulated light.

17. The mobile device of claim 16, wherein the at least two photodiode measurements comprise at least a first measurement from a first photodiode and a second measurement from a second, different photodiode, the at least two photodiode measurements taken during a measurement time.

18. The mobile device of claim 16, wherein the processing unit is configured to receive sensor data comprising at least one data type selected from the group consisting of decoded sensor data and modulated sensor data.

19. An apparatus comprising: means for obtaining a request to determine an approximate user view direction, wherein the approximate user view direction comprises an approximate field of view of a user wearing a head-mountable apparatus; means for sending, via wireless communication and based on the request to determine the approximate user view direction, a request for sensor data generated by one or more light sensors of the head-mountable apparatus in response to detecting light from one or more modulated light sources; means for receiving, via wireless communication and in response to sending the request for the sensor data, sensor data generated by one or more light sensors of the head-mountable apparatus; means for obtaining, for each of the one or more modulated light sources, location information of the respective modulated light source; means for determining the approximate user view direction based, at least in part, on the sensor data and the location information; and means for generating information indicative of the approximate user view direction.

20. The apparatus of claim 19, wherein the means for determining the approximate user view direction comprise means for determining, from the sensor data, an angle of arrival of light received from the one or more modulated light sources.

21. The apparatus of claim 19, further comprising means for performing a calibration function to determine an approximate location of the head-mountable apparatus on the user's head.

22. A non-transitory computer-readable medium having instructions embedded thereon for view direction determination, the instructions comprising computer code for: obtaining a request to determine an approximate user view direction, wherein the approximate user view direction comprises an approximate field of view of a user wearing a head-mountable apparatus; based on the request to determine the approximate user view direction, sending, via wireless communication from a mobile device to the head-mountable apparatus, a request for sensor data generated by one or more light sensors of the head-mountable apparatus in response to detecting light from one or more modulated light sources; receiving, via wireless communication with the head-mountable apparatus and in response to sending the request for sensor data, sensor data generated by one or more light sensors of the head-mountable apparatus; obtaining, for each of the one or more modulated light sources, location information of the respective modulated light source; determining the approximate user view direction based, at least in part, on the sensor data and the location information; and generating information indicative of the approximate user view direction.

23. The non-transitory computer-readable medium of claim 22, wherein the computer code for determining the approximate user view direction comprises computer code for determining, from the sensor data, an angle of arrival of light received from the one or more modulated light sources.

* * * * *